(12) United States Patent
Kang et al.

(10) Patent No.: US 12,145,872 B1
(45) Date of Patent: Nov. 19, 2024

(54) HIGH-EFFICIENCY AND MULTIFUNCTIONAL SLUDGE CONDITIONER AND PREPARATION METHOD THEREOF

(71) Applicant: Shenzhen Shenshui Water Resources Consulting Co., Ltd., Guangdong (CN)

(72) Inventors: Xu Kang, Guangdong (CN); Wei Zhang, Guangdong (CN); Qingjie Meng, Guangdong (CN); Shasha Qi, Guangdong (CN); Jiabao Zhang, Guangdong (CN); Yanmei Wang, Guangdong (CN); Binger Zeng, Guangdong (CN); Xue Xu, Guangdong (CN); Lingling Cao, Guangdong (CN); Xianbiao Tang, Guangdong (CN)

(73) Assignee: Shenzhen Shenshui Water Resources Consulting Co., Ltd., Guangdong (CN)

( * ) Notice: Subject to any disclaimer, the term of this patent is extended or adjusted under 35 U.S.C. 154(b) by 0 days.

(21) Appl. No.: 18/740,275

(22) Filed: Jun. 11, 2024

(30) Foreign Application Priority Data

Sep. 26, 2023 (CN) .......................... 202311249109.4

(51) Int. Cl.
*C02F 11/147* (2019.01)
*C02F 11/00* (2006.01)
*C02F 11/148* (2019.01)
*C02F 101/20* (2006.01)

(52) U.S. Cl.
CPC .......... *C02F 11/148* (2019.01); *C02F 11/004* (2013.01); *C02F 2101/20* (2013.01)

(58) Field of Classification Search
CPC ......... C02F 11/00; C02F 11/14; C02F 11/147; C02F 11/148; C02F 11/004; C02F 11/02; C02F 2101/20; C02F 2103/36
See application file for complete search history.

(56) References Cited

U.S. PATENT DOCUMENTS

| | | | |
|---|---|---|---|
| 2017/0211017 A1* | 7/2017 | Sivik ...................... | C11D 3/505 |
| 2019/0031574 A1 | 1/2019 | Liu et al. | |

FOREIGN PATENT DOCUMENTS

| | | | |
|---|---|---|---|
| CN | 101985386 A | | 3/2011 |
| CN | 103145919 A | | 6/2013 |
| CN | 103183780 A | | 7/2013 |
| CN | 103806130 A | | 5/2014 |
| CN | 105753122 A | * | 7/2016 ................ C02F 1/52 |
| CN | 105836998 A | | 8/2016 |
| CN | 105936532 A | | 9/2016 |
| CN | 107936193 A | | 4/2018 |
| CN | 116986788 B | | 1/2024 |

OTHER PUBLICATIONS

Effect of cationization pretreatment on the properties of cationic Eucalyptus micro/nanofibrillated cellulose, Pedrosa et al., International Journal of Biological Macromolecules 201 (2022) 468-479.*
Advanced anaerobic digested sludge dewaterability enhancement using sludge based activated carbon (SBAC) in combination with organic polymers, Wang et al., Chemical Engineering Journal 350 (2018) 660-672.*
Flocculation behavior of cationic pea starch prepared by the graft copolymerization of acrylamide for wastewater treatment, Zou et al., J. Appl. Polym. Sci. 2016, DOI: 10.1002/APP.43922.*
First Office Action for Application or Publication No. 202311249109.4 filed Sep. 26, 2023 of family patent CN 116986788 A dated Nov. 8, 2023, 13 pgs.
First Search for Application No. 2023112491094 filed on Sep. 26, 2023 of family patent CN 116986788 A dated Nov. 7, 2023, 3 pgs.
Second Office Action for Application or Publication No. 202311249109.4 filed Sep. 26, 2023 of family patent CN 116986788 A dated Nov. 30, 2023, 15 pgs.
Huang Yang et al., "Bacterial cellulose whisker/poly(acrylic acid-acrylamide) composite super absorbent resin", Acta Polymerica Sinica, No. 9, Sep. 2013, doi: 10. 3724 /SP . J . 1105. 2013. 12397, 14 pgs.
Zhen-Yu Wu, "Large-scale preparation of functional carbon nanofiber materials and their applications", University of Science and Technology of China, Jun. 6, 2016, 205 pgs. With English Abstract.
Notification to Grant Patent Right for Invention for Application No. or Publication No. 202311249109.4 dated Dec. 21, 2023, 3 pgs.

* cited by examiner

*Primary Examiner* — Haidung D Nguyen
(74) *Attorney, Agent, or Firm* — Alix, Yale & Ristas, LLP

(57) ABSTRACT

A high-efficiency and multifunctional sludge conditioner and a preparation method thereof is disclosed. The preparation method includes: soaking and adsorbing bacterial cellulose in an alkaline solution, and then taking out the bacterial cellulose to carbonize and activate the same at 380-480° C. and in a nitrogen atmosphere to obtain pretreated bacterial cellulose; and dispersing the pretreated bacterial cellulose in water, adding with an acrylamide monomer and an initiator for in-situ polymerization, and successively subjecting a reaction product to centrifugal separation, drying and crushing to obtain the high-efficiency and multifunctional sludge conditioner. In the present disclosure, the high-efficiency and multifunctional sludge conditioner only has a good flocculation sedimentation effect on the sludge, but also has a good adsorption effect on heavy metals in the water, thereby reducing the moisture content of the sludge and simultaneously reducing the content of the heavy metals and other harmful substances in the water body.

6 Claims, 2 Drawing Sheets

HIGH-EFFICIENCY AND MULTIFUNCTIONAL SLUDGE CONDITIONER AND PREPARATION METHOD THEREOF

CROSS-REFERENCE TO THE RELATED APPLICATION

This application is filed on the basis of and claims the priority of Chinese Patent Application No. 202311249109.4 filed Sep. 26, 2023, the entire contents of which are incorporated herein by reference.

TECHNICAL FIELD

The present disclosure relates to the technical field of treatment of sludge, and in particular to a high-efficiency and multifunctional sludge conditioner and a preparation method thereof.

BACKGROUND

The basic methods of treatment of sludge include a physical treatment method, a chemical treatment method and a biological treatment method, and the first step of each method is the dehydration and volume reduction of sludge, which has an important influence on the entire sludge treatment and disposal process, technical costs and subsequent treatment effects as the beginning of each treatment process. The treatment method of sludge dehydration mainly comprises flocculation, sedimentation and then separation. A polymer flocculant represented by polyacrylamide (PAM) accounts for 80% of the dosage of a treating agent. However, this flocculant has the disadvantages of high cost and toxicity, and is difficult to achieve dehydration standard requirements that the sludge dehydration rate reaches 80% or below under centrifuge process conditions and 60% or below under process conditions of a plate-and-frame filter press, and this flocculant has a relatively simple flocculation function to the sludge. Therefore, the flocculant is usually grafted and modified, and is used together with an inorganic flocculant in the prior art, thus providing the flocculant with more functions.

Chinese patent publication No. CN107936193A discloses a preparation method and use of a starch type flocculant. The starch type flocculant, obtained by step-by-step polymerization of starch, acrylamide, and a cationic monomer through an initiator, has a good effect on removing suspended solids in water, a good flocculation effect on river sludge, thick floc and fast settling speed. However, this flocculant has a relatively small specific surface area and a poor adsorption performance for heavy metals in sludge. Chinese patent publication No. CN105836998A discloses a method for conditioning excess sludge through a combination of ultrasonic disintegration, cationic polyacrylamide flocculation and biomass rice husk powder skeleton construction, which comprises the following steps: subjecting an excess sludge to ultrasonic disintegration; and successively adding cationic polyacrylamide with a concentration of 20 to 30 mg/L and biomass rice husk powder accounting for 40% to 50% of the dry weight of the sludge into the excess sludge so as to condition the excess sludge and improve a dehydration property of the excess sludge. Although a moisture content of a sludge filter cake is reduced, the amount of biomass rice husk powder is larger, which increases the burden of a solid waste treatment. Chinese patent publication No. CN101985386A discloses a conditioner and a conditioning method for dewatering of domestic sludge, which comprises: at a normal temperature and a normal pressure, successively adding polymeric aluminum sulfate, quick lime and bamboo charcoal into a sludge to be processed, stirring the sludge for reaction for at least 5 minutes, then successively adding polyacrylamide and quaternary ammonium salt, stirring the sludge for at least 3 minutes, and finally subjected the sludge for filter pressing, and the treated filter cake has a moisture content of 40%-50%. Although this conditioner can reduce the moisture content of the sludge, the structural strength of a mud cake is low, requiring high filter-press conditions, and the filter cake is not easy to peel off from a filter medium. In addition, the filter-pressed water still contains various macromolecular organic pollutants and heavy metal ions, which increases the burden of the subsequent sewage treatment.

Therefore, it is necessary to provide an improved, high-efficiency and multifunctional sludge conditioner and a preparation method thereof, to solve the above problem.

SUMMARY

The objective of the present disclosure is to provide a high-efficiency and multifunctional sludge conditioner and a preparation method thereof. Bacterial cellulose is subjected to an alkali treatment and a carbonization activation to improve a porosity and a chemical activity thereof, and then acrylamide is polymerized in-situ and forms an interpenetrating network with the bacterial cellulose through hydrogen-bond interaction and covalent-bond interaction. The obtained product not only has a good flocculation effect on the sludge, significantly reducing the moisture content of the sludge, but also has a good adsorption and removal effect on heavy metals in the water, effectively improving the treatment effect of a sludge water body.

In order to achieve the above objective, the present disclosure provides a preparation method of a high-efficiency and multifunctional sludge conditioner, including the following steps:

S1. soaking and adsorbing bacterial cellulose in an alkaline solution, and then taking out the bacterial cellulose to carbonize and activate the same at 380-480° C. and in a nitrogen atmosphere to obtain pretreated bacterial cellulose; and S2. dispersing the pretreated bacterial cellulose in water, adding with an acrylamide monomer and an initiator for in-situ polymerization, and successively subjecting a reaction product to centrifugal separation, drying and crushing to obtain the high-efficiency and multifunctional sludge conditioner.

As a further improvement of the present disclosure, the alkaline solution is a sodium hydroxide solution with a concentration of 2-3 mol/L, and the soaking and adsorbing is conducted for 1-5 h.

As a further improvement of the present disclosure, the carbonization and activation is conducted for 1-3 h.

As a further improvement of the present disclosure, the pretreated bacterial cellulose has a porosity of 40%-60%.

As a further improvement of the present disclosure, an added amount of the acrylamide monomer is 10%-60% of a mass of the pretreated bacterial cellulose.

As a further improvement of the present disclosure, the step S1 includes: soaking and absorbing the bacterial cellulose in the sodium hydroxide solution with a concentration of 2-3 mol/L for 1-5 h, taking out the bacterial cellulose and placing the bacterial cellulose in a tube furnace, introducing nitrogen, heating the tube furnace to 380-480° C. at a heating rate of 5-10° C./min, holding for 1-3 h, and cooling down and taking out the bacterial cellulose to obtain the pretreated bacterial cellulose.

As a further improvement of the present disclosure, the in-situ polymerization is conducted at a temperature of 50-80° C. for 4-8 h.

As a further improvement of the present disclosure, a cationic monomer is also added in the step S2, and a molar ratio of the cationic monomer to the acrylamide monomer is 1:(2-5); and the cationic monomer includes one or more of dimethyl diallyl ammonium chloride, methacryloyloxyethyl trimethyl ammonium chloride, or acryloyloxyethyl trimethyl ammonium chloride.

As a further improvement of the present disclosure, the initiator is an azo initiator, and an added amount of the initiator is 0.01%-0.04% of a mass of the acrylamide monomer. Specifically, the initiator includes one or a combination of several of a cyclic azoamidine initiator VA-044, a cyclic azoamidine initiator V501, a cyclic azoamidine initiator V601, an oil-soluble azo compound initiator azodiisobutyronitrile, an oil-soluble azo compound initiator azobisvaleronitrile, and an oil-soluble azo compound initiator dimethyl 2,2'-azobis(2-methylpropionate).

As a further improvement of the present disclosure, the pretreated bacterial cellulose and the high-efficiency and multifunctional sludge conditioner have a particle size of 30-80 μm.

A high-efficiency and multifunctional sludge conditioner, which is prepared by any one of the preparation method of the high-efficiency and multifunctional sludge conditioner as described above.

The beneficial effects of the present disclosure are as follows.

The bacterial cellulose with a high strength and a fine network structure is used as the skeleton of the high-efficiency and multifunctional sludge conditioner provided by the present disclosure, the bacterial cellulose is subjected to the alkali treatment and the carbonization activation to improve the porosity and the chemical activity thereof, and then the acrylamide is polymerized in-situ and forms the interpenetrating network with the bacterial cellulose through hydrogen-bond interaction and covalent-bond interaction; and the obtained product not only has a good flocculation effect on the sludge, significantly reducing the moisture content of the sludge, but also has a good adsorption and removal effect on heavy metals in the water, effectively improving the treatment effect of the sludge water body.

BRIEF DESCRIPTION OF DRAWINGS

To better clarify the present disclosure or the technical solution in the prior art, the drawings required to illustrate the embodiments or the prior art will be simply described below. It is apparent that the drawings described below merely illustrate some embodiments of the present disclosure. Those ordinarily skilled in the art can obtain other drawings according to these drawings without contributing creative labor on the basis of those drawings.

DETAILED DESCRIPTION

In order to make the objectives, technical solution and advantages of the present disclosure clearer, the technical solutions of the present disclosure are clearly and completely elaborated below. It is apparent that the described examples are a part of the examples of the present disclosure but not all. Based on the examples of the present disclosure, all the other examples obtained by those of ordinary skill in the art on the premise of not contributing creative effort should belong to the scope of protection of the present disclosure.

Bacterial cellulose is synthesized by microorganisms such as acetobacter, agrobacterium, rhizobium and sarcina. For example, during the biosynthesis of cellulose, the movement of acetic bacteria controls the accumulation and arrangement of the secreted microfibers. Usually, the acetic bacteria move freely in a three-dimensional direction in a culture solution, and forms a highly developed fine network texture structure (microfibers with a diameter of 3-4 nanometers form fiber bundles with a thickness of 40-60 nanometers, and interweave with each other to form a highly developed ultra-fine network structure), with a high strength and a good water retention. Therefore, in the prior art, the bacterial cellulose are mostly used as a reinforcing component of composite materials such as medical materials and paper, and the bacterial cellulose is rarely used to prepare composite flocculants by advantage of its pore structure. Therefore, in the present disclosure, by advantage of the fine structure itself of the bacterial cellulose, an activation pretreatment and then in-situ polymerization is performed on the bacterial cellulose, to obtain the high-efficiency and multifunctional sludge conditioner, with a broad application prospect.

Figure 1:
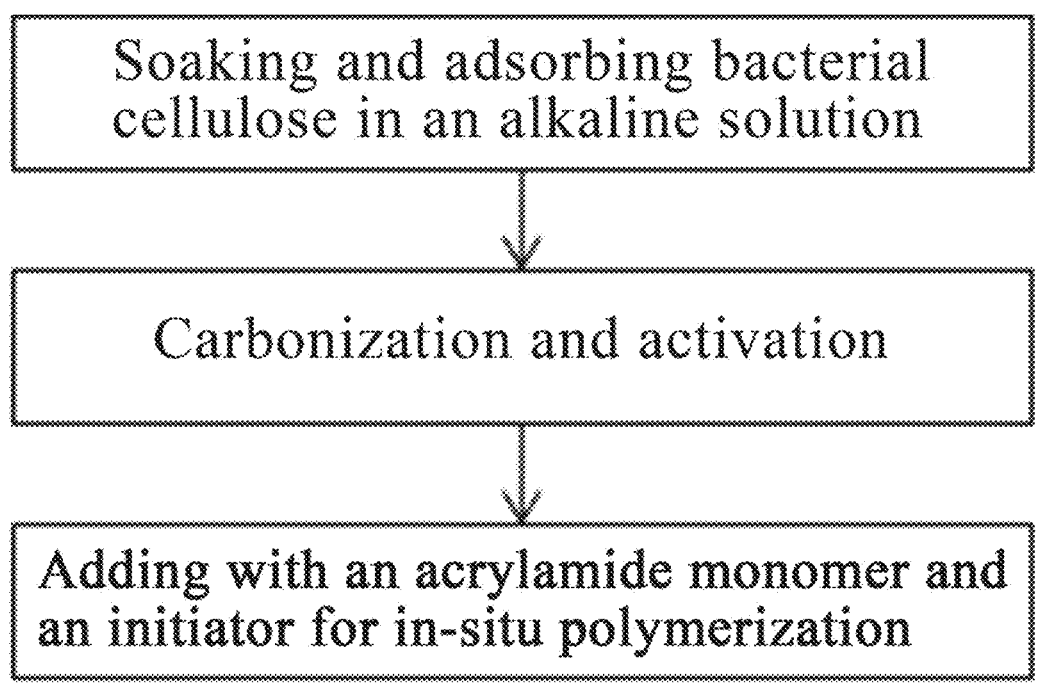
FIG. 1 is a flow chart of a preparation method of a high-efficiency and multifunctional sludge conditioner provided by the present disclosure.

As shown in FIG. 1, a preparation method of a high-efficiency and multifunctional sludge conditioner provided by the present disclosure includes the following steps:

S1. Soaking and adsorbing bacterial cellulose in an alkaline solution, and then taking out the bacterial cellulose to carbonize and activate the same at 380-480° C. and in a nitrogen atmosphere to obtain pretreated bacterial cellulose. The bacterial cellulose is directly placed in a tube furnace to be heated and carbonized without requiring drying after soaking and adsorbing, on the one hand, the soaking and adsorption of the alkaline solution can initially dissolve the bacterial cellulose, which is conducive to increasing the porosity; and on the other hand, the adsorbed alkali can act as a catalyst during the carbonization, increasing a chemical pyrolysis degree, thereby increasing the porosity and providing active sites.

Figure 2:
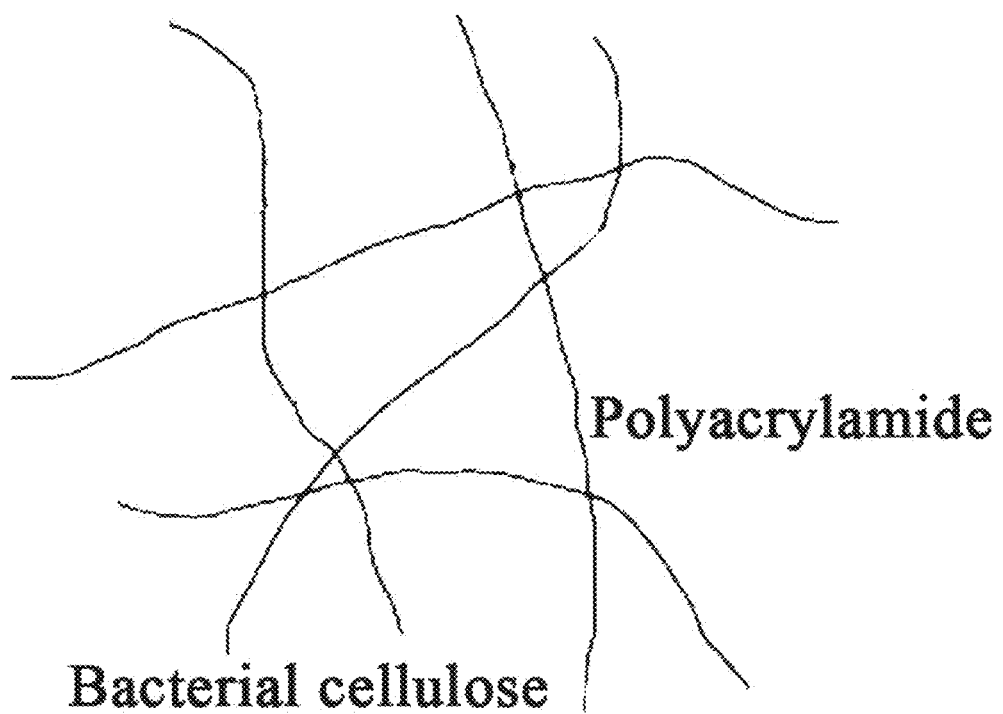
FIG. 2 is a schematic structural diagram of a cross-linked network of bacterial cellulose and polyacrylamide of the present disclosure.

S2. Dispersing the pretreated bacterial cellulose in water, adding with an acrylamide monomer and an initiator for in-situ polymerization, and subjecting a reaction product to centrifugal separation, drying and crushing to obtain the high-efficiency and multifunctional sludge conditioner. The acrylamide monomer penetrates into the inner and outer surfaces of the bacterial cellulose, polymerizes in-situ and forms an interpenetrating network. The reaction product is crushed into micrometer powder to increase the specific surface area, and a network composition structure inside the powder is as shown in FIG. 2. When the high-efficiency and multifunctional sludge conditioner is used for flocculation of sludge, the polyacrylamide distributed on the surface and a large number of active groups of the bacterial cellulose can quickly absorb the suspended solids to form floc, which is beneficial to the dehydration of sludge and the reduction of the moisture content; moreover, the porous structure and a large number of active groups such as hydroxyl groups of the bacterial cellulose have good adsorption and chelation effects on heavy metals in the water body, which can significantly reduce the content of the heavy metals in the water.

The alkaline solution is a sodium hydroxide solution with a concentration of 2-3 mol/L, the soaking and adsorbing is conducted for 1-5 h, the carbonization and activation is conducted for 1-3 h, and the pretreated bacterial cellulose has a porosity of 40%-60%.

An added amount of the acrylamide monomer is 10%-60% of a mass of the pretreated bacterial cellulose, preferably 30%-40%. When the content of polyacrylamide is too small, there will be fewer flocculation sites, affecting the flocculation effect; and when the content of polyacrylamide is too high, the porosity of the bacterial cellulose will be reduced, thereby reducing the adsorption effect on the heavy metals and increasing costs. By compounding the above two situations, the flocculation effect thereof can be guaranteed while reducing the amount of polyacrylamide, significantly reducing costs and pollution; and the bacterial cellulose is easy to biodegrade, and thus it is green and pollution-free.

The step S1 includes: soaking and absorbing the bacterial cellulose in the sodium hydroxide solution with a concentration of 2-3 mol/L for 1-5 h, taking out the bacterial cellulose and placing the bacterial cellulose in a tube furnace, introducing nitrogen, heating the tube furnace to 380-480° C. at a heating rate of 5-10° C./min, holding for 1-3 h, and cooling down and taking out the bacterial cellulose to obtain the pretreated bacterial cellulose.

The in-situ polymerization is conducted at a temperature of 50-80° C. for 4-8 h.

Further, a cationic monomer is also added in the step S2, and a molar ratio of the cationic monomer to the acrylamide monomer is 1:(2-5); and the cationic monomer includes one or more of dimethyl diallyl ammonium chloride, methacryloyloxyethyl trimethyl ammonium chloride, or acryloyloxyethyl trimethyl ammonium chloride.

The initiator is an azo initiator, and an added amount of the initiator is 0.01%-0.04% of a mass of the acrylamide monomer. Specifically, the initiator includes one or a combination of several of a cyclic azoamidine initiator VA-044, a cyclic azoamidine initiator V501, a cyclic azoamidine initiator V601, an oil-soluble azo compound initiator azodiisobutyronitrile, an oil-soluble azo compound initiator azobisvaleronitrile, and an oil-soluble azo compound initiator dimethyl 2,2'-azobis(2-methylpropionate).

The pretreated bacterial cellulose and the high-efficiency and multifunctional sludge conditioner have a particle size of 30-80 μm. The crushed micrometer powder is still composed of an interpenetrating network of nanometer bacterial cellulose and polyacrylamide, and is rich in micro-nanometer voids, which facilitates the adsorption of the sludge.

A high-efficiency and multifunctional sludge conditioner, which is prepared by any one of the preparation method of the high-efficiency and multifunctional sludge conditioner as described above.

Example 1

A preparation method of a high-efficiency and multifunctional sludge conditioner included the following steps:

S1. Bacterial cellulose was soaked and adsorbed in a 2 mol/L sodium hydroxide solution for 2 h, then the bacterial cellulose was taken out and placed in a tube furnace, introduced with nitrogen, heated to 420° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 5 h at 70° C., wherein an added amount of the acrylamide monomer was 40% of a mass of the pretreated bacterial cellulose; and a reaction product was centrifugally separated, dried and crushed to obtain the high-efficiency and multifunctional sludge conditioner with an average particle size of 50 microns.

Example 2

A preparation method of a high-efficiency and multifunctional sludge conditioner included the following steps:

S1. Bacterial cellulose was soaked and adsorbed in a 2 mol/L sodium hydroxide solution for 3 h, then the bacterial cellulose was taken out and placed in a tube furnace, introduced with nitrogen, heated to 450° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 4 h at 70° C., wherein an added amount of the acrylamide monomer was 30% of a mass of the pretreated bacterial cellulose; and a reaction product was centrifugally separated, dried and crushed to obtain the high-efficiency and multifunctional sludge conditioner with an average particle size of 50 microns.

Example 3

A preparation method of a high-efficiency and multifunctional sludge conditioner included the following steps:

S1. Bacterial cellulose was soaked and adsorbed in a 2 mol/L sodium hydroxide solution for 3 h, then the bacterial cellulose was taken out and placed in a tube furnace, introduced with nitrogen, heated to 430° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 4 h at 70° C., wherein an added amount of the acrylamide monomer was 10% of a mass of the pretreated bacterial cellulose; and a reaction product was centrifugally separated, dried and crushed to obtain the high-efficiency and multifunctional sludge conditioner with an average particle size of 50 microns.

Example 4

A preparation method of a high-efficiency and multifunctional sludge conditioner included the following steps:

S1. Bacterial cellulose was soaked and adsorbed in a 2 mol/L sodium hydroxide solution for 3 h, then the bacterial cellulose was taken out and placed in a tube furnace, introduced with nitrogen, heated to 420° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 5 h at 70° C., wherein an added amount of the acrylamide monomer was 60% of a mass of the pretreated bacterial cellulose; and a reaction product was centrifugally separated, dried and crushed to obtain the high-efficiency and multifunctional sludge conditioner with an average particle size of 50 microns.

Example 5

A preparation method of a high-efficiency and multifunctional sludge conditioner included the following steps:

S1. Bacterial cellulose was soaked and adsorbed in a 2 mol/L sodium hydroxide solution for 2 h, then the bacterial cellulose was taken out and placed in a tube furnace, introduced with nitrogen, heated to 420° C. at a heating rate of 8° C./min, held for 2 h, cooled down and taken out to obtain pretreated bacterial cellulose.

S2. The pretreated bacterial cellulose was dispersed in water, and added with an acrylamide monomer, methacryloyloxyethyl trimethyl ammonium chloride and an azo initiator for in-situ polymerization d for 5 h at 70° C., wherein an added amount of the acrylamide monomer was 40% of a mass of the pretreated bacterial cellulose, a molar ratio of the methacryloyloxyethyl trimethyl ammonium chloride to the acrylamide monomer was 1:3; and a reaction product was centrifugally separated, dried and crushed to obtain the high-efficiency and multifunctional sludge conditioner with an average particle size of 50 microns.

Comparative Example 1

A preparation method of a sludge conditioner included the following steps:

Bacterial cellulose was dispersed in water, and added with an acrylamide monomer and an azo initiator for in-situ polymerization for 5 h at 70° C., wherein an added amount of the acrylamide monomer was 40% of a mass of the bacterial cellulose; and a reaction product was centrifugally separated, dried and crushed to obtain the sludge conditioner with an average particle size of 50 microns.

Comparative Example 2

A preparation method of a high-efficiency and multifunctional sludge conditioner included the following steps:

S1. Bacterial cellulose was soaked and adsorbed in a 2 mol/L sodium hydroxide solution for 2 h, and then the bacterial cellulose was taken out, washed and dried to obtain pretreated bacterial cellulose.

S2. The pretreated bacterial cellulose was dispersed in water, and added with an acrylamide monomer and an azo initiator for in-situ polymerization for 5 h at 70° C., wherein an added amount of the acrylamide monomer was 40% of a mass of the pretreated bacterial cellulose; and a reaction product was centrifugally separated, dried and crushed to obtain the high-efficiency and multifunctional sludge conditioner with an average particle size of 50 microns.

Comparative Example 3

A preparation method of a high-efficiency and multifunctional sludge conditioner included the following steps:

S1. Bacterial cellulose was placed in a tube furnace, introduced with nitrogen, heated to 420° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 5 h at 70° C., wherein an added amount of the acrylamide monomer was 40% of a mass of the pretreated bacterial cellulose; and a reaction product was centrifugally separated, dried and crushed to obtain the high-efficiency and multifunctional sludge conditioner with an average particle size of 50 microns.

Comparative Example 4

A preparation method of a high-efficiency and multifunctional sludge conditioner included the following steps:

S1. Bacterial cellulose was soaked and adsorbed in a 2 mol/L sodium hydroxide solution for 2 h, then the bacterial cellulose was taken out and placed in a tube furnace, introduced with nitrogen, heated to 500° C. at a heating rate of 8° C./min, held for 2 h, cooled down and taken out to obtain pretreated bacterial cellulose.

S2. The pretreated bacterial cellulose was dispersed in water, and added with an acrylamide monomer and an azo initiator for in-situ polymerization for 5 h at 70° C., wherein an added amount of the acrylamide monomer was 40% of a mass of the pretreated bacterial cellulose; and a reaction product was centrifugally separated, dried and crushed to obtain the high-efficiency and multifunctional sludge conditioner with an average particle size of 50 microns.

Comparative Example 5

A preparation method of a sludge conditioner included the following steps:

An acrylamide monomer and an azo initiator were polymerized at 70° C. for 5 h, and then mixed with bacterial cellulose; and a resulting mixture was dried and crushed to obtain the sludge conditioner with an average particle size of 50 microns, wherein an added amount of the acrylamide monomer was 40% of a mass of the bacterial cellulose.

The sludge conditioners of Examples 1 to 5 and Comparative Examples 1 to 5 were added to the sludge with a moisture content of 98%, wherein an added amount of the sludge conditioner was 5% absolute dry weight of the sludge; then the sludge was stirred for 15 min, and subjected to press-filtration for dehydration for 30 min under a dehydration pressure of 1.5 MPa by a plate-and-frame filter press; then the pressure was released and the sludge was discharged; and a moisture content of the sludge and a Pb content of the filter-pressed sewage in Examples 1 to 5 and Comparative examples 1 to 5 as well as blank examples in which no treating agent was added were tested. The original Pb content in the sludge with a moisture content of 98% was 12±0.5 ppm.

TABLE 1

Test results of the moisture content and Pb content of sludge filter cake

| Sample | Moisture content (%) | Pb content (ppm) |
| --- | --- | --- |
| Example 1 | 53 | <0.2 |
| Example 2 | 54 | <0.2 |
| Example 3 | 58 | <0.2 |
| Example 4 | 55 | <0.3 |
| Example 5 | 51 | <0.2 |
| Comparative example 1 | 63 | >0.5 |
| Comparative example 2 | 59 | 0.3-0.4 |
| Comparative example 3 | 57 | 0.2-0.3 |
| Comparative example 4 | 58 | 0.2-0.3 |
| Comparative example 5 | 67 | >0.5 |
| Blank example | 78 | >5 |

It can be seen from Table 1 that the composite sludge conditioner obtained by the method of the present disclosure can significantly reduce the moisture content of the sludge and the Pb content in water. Moreover, when the content of acrylamide is too small, the moisture content increases, and when the content of acrylamide is too high, the Pb content increases, indicating that a better comprehensive effect can be obtained by combining the acrylamide and the bacterial cellulose in a specific ratio. When alkali treatment and carbonization are not performed, both the moisture content and Pb content increase; when polyacrylamide is polymerized first and then mixed with the bacterial cellulose, the moisture content and Pb content are higher than those of the in-situ polymerization, indicating that in-situ polymerization helps to form an interpenetrating network structure, which has better flocculation and heavy metal adsorption effects. When the temperature of carbonization is too high, the bacterial cellulose will be excessively degraded and the content of active groups such as hydroxyl groups thereof will be reduced, thereby affecting the flocculation and adsorption performances.

Finally, it should be noted that the above examples are merely used for illustrating the technical solution of the present disclosure instead of limiting the technical solution of the present disclosure. Although the present disclosure is described in details with reference to the above examples, those of ordinary skill in the art should understand that they can still make modifications to the technical solution recorded in the above example, or make equivalent replacements to part of technical features. However, these modifications or replacement do not deviate the nature of the corresponding technical solution from the scope of the technical solution of various example of the present disclosure.

The invention claimed is:

1. A preparation method of a high-efficiency and multifunctional sludge conditioner, comprising the following steps:
    S1. soaking and adsorbing bacterial cellulose in a sodium hydroxide solution with a concentration of 2-3 mol/L for 1-5 h, then taking out the bacterial cellulose and placing the bacterial cellulose in a tube furnace, introducing nitrogen, heating the tube furnace to 380-480° C. at a heating rate of 5-10° C./min, holding for 1-3 h, and cooling down and taking out the bacterial cellulose to obtain pretreated bacterial cellulose; and
    S2. dispersing the pretreated bacterial cellulose in water, adding with an acrylamide monomer and an initiator for in-situ polymerization, and successively subjecting a reaction product to centrifugal separation, drying and crushing to obtain the high-efficiency and multifunctional sludge conditioner;
    wherein an added amount of the acrylamide monomer is 30%-40% of a mass of the pretreated bacterial cellulose;
    the pretreated bacterial cellulose has a porosity of 40%-60%;
    the in-situ polymerization is conducted at a temperature of 50-80° C. for 4-8 h;
    a cationic monomer is also added in step S2, and a molar ratio of the cationic monomer to the acrylamide monomer is 1:(2-5); and
    the cationic monomer comprises one or more of dimethyl diallyl ammonium chloride, methacryloyloxyethyl trimethyl ammonium chloride, or acryloyloxyethyl trimethyl ammonium chloride.

2. The preparation method of the high-efficiency and multifunctional sludge conditioner according to claim 1, wherein the initiator is an azo initiator, and an added amount of the initiator is 0.01%-0.04% of a mass of the acrylamide monomer.

3. The preparation method of the high-efficiency and multifunctional sludge conditioner according to claim 1, wherein the high-efficiency and multifunctional sludge conditioner has a particle size of 30-80 μm.

4. A high-efficiency and multifunctional sludge conditioner prepared by the preparation method of the high-efficiency and multifunctional sludge conditioner according to claim 1.

5. A high-efficiency and multifunctional sludge conditioner prepared by the preparation method of the high-efficiency and multifunctional sludge conditioner according to claim 2.

6. A high-efficiency and multifunctional sludge conditioner prepared by the preparation method of the high-efficiency and multifunctional sludge conditioner according to claim 3.

* * * * *